United States Patent [19]
Kucera et al.

[11] Patent Number: 5,138,608
[45] Date of Patent: Aug. 11, 1992

[54] CIRCUIT ARRANGEMENT FOR TESTING PARTS OF A DIGITAL TIME-DIVISION TELECOMMUNICATION SWITCHING CENTER, PARTICULARLY A TELEPHONE SWITCHING CENTER

[75] Inventors: Walter Kucera, Vienna, Austria; Werner Nagler, Hohenschaeftlarn, Fed. Rep. of Germany; Eckard Tiwald, Vienna, Austria

[73] Assignee: Siemens Aktiengesellschaft, Munich, Fed. Rep. of Germany

[21] Appl. No.: 589,053

[22] Filed: Sep. 27, 1990

[30] Foreign Application Priority Data

Sep. 29, 1989 [DE] Fed. Rep. of Germany ....... 3932682

[51] Int. Cl.$^5$ .................. H04J 3/14; H04L 12/26; H04Q 1/20
[52] U.S. Cl. ........................ 370/13; 371/27; 371/20.4
[58] Field of Search .............. 370/13, 15, 85.7; 371/15.1, 20.1, 20.4, 27

[56] References Cited

U.S. PATENT DOCUMENTS

| | | | |
|---|---|---|---|
| 4,592,044 | 5/1986 | Ferenc | 370/13 |
| 4,608,683 | 8/1986 | Shigaki | 370/13 |
| 4,621,354 | 11/1986 | Jones, Jr. et al. | 370/13 |
| 4,821,256 | 4/1989 | Schmidt et al. | 370/13 |

Primary Examiner—Douglas W. Olms
Assistant Examiner—Min Jung
Attorney, Agent, or Firm—Hill, Van Santen, Steadman & Simpson

[57] ABSTRACT

A receiving circuit for evaluating check words received after traversing a test loop for coincidence with the check word transmitted is utilized in time-division multiplex operation for the sequencing of test implemented in parallel and is reached via a multiplex line on which a defined time slot is allocated to each of the tests.

5 Claims, 1 Drawing Sheet

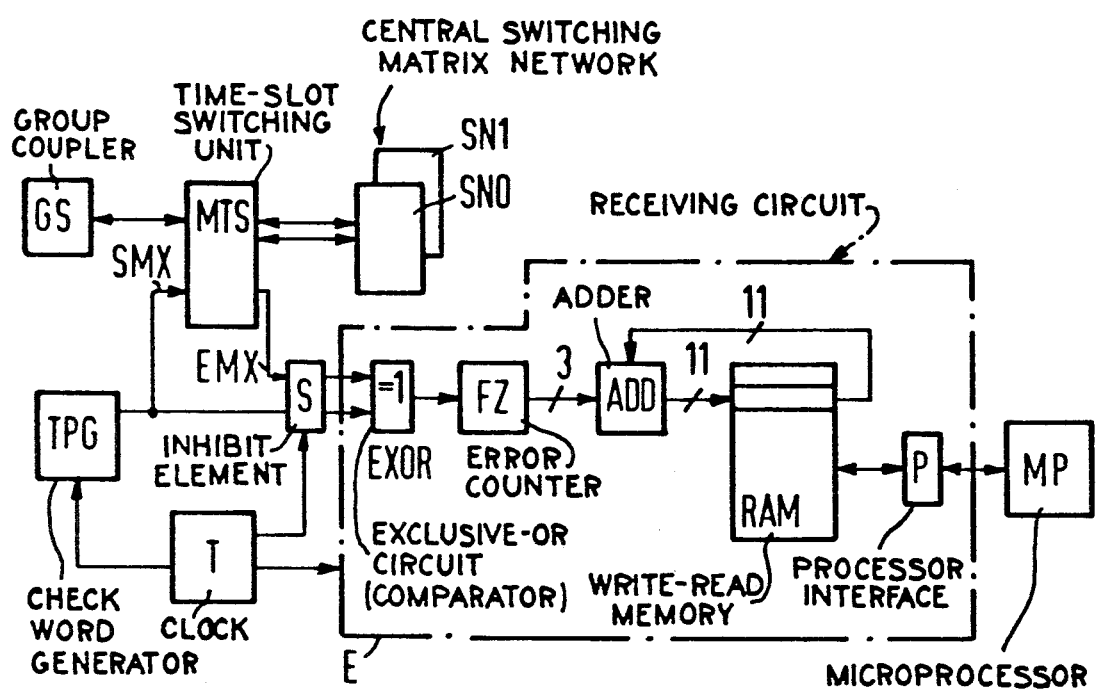

CIRCUIT ARRANGEMENT FOR TESTING PARTS OF A DIGITAL TIME-DIVISION TELECOMMUNICATION SWITCHING CENTER, PARTICULARLY A TELEPHONE SWITCHING CENTER

BACKGROUND OF THE INVENTION

1. Field of the Invention

The present invention relates to a circuit arrangement for testing parts of a digital time-division multiplex telecommunication switching center, particularly a telephone switching center comprising a check word generator for generating check words that are transmitted in defined time channels to the appertaining parts of the switching center and, after a mirroring, are transmitted back to the sending location where they are monitored for coincidence with the transmitted check word by a comparison with a receiving circuit.

2. Description of the Prior Art

Tests that are carried out according to the above-mentioned principle can differ due to the part of the switching center for whose monitoring they serve but, on the other hand, can also differ in terms of their objectives. A test whose objective is to check the switching-oriented procedures of the switching center at a switching center in which the line groups are formed with a group switching matrix network between which a connection is possible via a redundant, central switching matrix network can therefore be directed to a group switching matrix network or to the one or to the other part of the redundant, central switching matrix network. Such tests serving the purpose of checking the switching-oriented procedures are respectively implemented after the set-up procedures for a defined connection have been concluded and before the through-connection is then undertaken.

In addition to tests having this objective that must be implementable in time channels for the through-connection of calls, tests also come into consideration that are directed to defined assemblies within the switching center, for example multiplexers or interfaces, and for whose implementation a specific, fixed time channel is reserved. Another type of testing is provided in cases of a division of the switching center into active and redundant line groups is being provided in the form of continuous channel tests. They are then permanently executed at the respectively redundant line groups in a defined time channel that is not required for the through-connection of a call.

Due to such differences of the tests in terms of area of coverage and in terms of objective, there is an interest to be able to sequence individual test in parallel with one another. Heretofore, a separate test receiver was provided for each of the different test loops, the monitoring of the check word transmitted back on the test loop for coincidence with a transmitted check word having been undertaken on the basis thereof. Such a solution, of course, represents a considerable hardware expense for a greater plurality of tests to be executed in parallel.

SUMMARY OF THE INVENTION

The object of the present invention is to provide a testing concept that is more favorable in comparison to that heretofore known.

The above object is achieved, according to the present invention, with a circuit of the type initially set forth that comprises a check word generator for generating check words that are transmitted through the appertaining parts of a switching center in defined time slots and, after mirroring, are transmitted back to the sending location where they are checked by comparison for coincidence with the transmitted check word with a receiving circuit, and which is particularly characterized in that the receiving circuit is utilized for the implementation of a plurality of tests sequencing parallel in time-division multiplex operation, to which end it is connected to a receiving multiplex line on which the check words transmitted back after mirroring appear in time slots allocated to the individual tests, in that the receiving circuit also comprises a comparator shared in common by all tests that is operated time-slot wise and also comprises a write-read memory in which particulars regarding the coincidence errors identified in the comparisons can be stored in the individual, allocated memory cells.

With a circuit arrangement constructed and operated in accordance with the present invention, 128 tests can theoretically be simultaneously sequenced given a time channel structure having 128 time channels per pulse frame without a significant added expense being required in comparison to the implementation of a single test. What thereby acts as a beneficial factor is that a device for time-slot switching that is required in order to be able to implement the time-division multiplex operation of the receiving device in a suitable manner and according to the present invention is already present because of the possibility of being able to implement the same on all time channels as was heretofore already required.

Accordingly, such a time-slot switching unit according to a particular feature of the invention is utilized to convert check words that have proceeded back to the receiving location after mirroring into the time slot of the time channel that is allocated to the appertaining test on the receiving multiplex line leading to the receiving device.

According to another feature of the invention, the receiving circuit also comprises a common error counter with which bit errors repeatedly identified during a bit-serial comparison are counted before a stepping into the write-read memory occurs and also comprises an adder with which the data words corresponding to the respective counter reading are added to the data words already located in the write-read memory. This therefore opens up the possibility of prescribing an error threshold and of being able to recognize when this error threshold is reached.

Yet another feature of the invention is directed to providing an interface via which a microprocessor can asynchronously access the content of the memory cells. This does justice to the different objectives of the individual tests.

BRIEF DESCRIPTION OF THE DRAWING

Other objects, features and advantages of the invention, its organization, construction and operation will be best understood from the following detailed description, taken in conjunction with the accompanying drawing on which there is a single FIGURE which is a block circuit diagram of a circuit arrangement constructed in accordance with the present invention.

DESCRIPTION OF THE PREFERRED EMBODIMENT

As parts of a digital time-division multiplex telephone switching center, the drawing illustrates a group coupler GS that is a component part of a line group for the connection of the subscriber and/or trunks, as well as the elements SN0 and SN1 of a redundant, central switching matrix network by way of which a connection between lines connected to different line groups of this type occurs.

The drawing also illustrates a check word generator TPG for generating check words. In practice, the check word generator may be realized in the form of a four-bit binary counter that, accordingly, is capable of delivering 16 different bit combinations. In the described example, however, a check word is composed of 8 bits, whereby 4 of these 8 bits represent the respectively inverted values of the bits delivered by the check word generator. The check word generator TPG is advanced after 8 ms in contrast whereto an inversion of the eight-bit check word occurs every 4 ms. The switching period of the check word generator, 8 ms, corresponds to the length of a superframe that covers 32 pulse frames, whereby a pulse frame respectively contains the time intervals of 128 time slots.

The check words generated by the check word generator TPG are delivered on a transmission multiplex line SMX to a time-slot switching unit MTS with which a time slot conversion into the time slot that is to be used in the test occurs and that defines the path to the part of the switching center to be tested, i.e. either to the group coupler GS or to the central switching matrix network SN0, SN1. After passing through an appertaining part of the switching center and after mirroring, the check words are transmitted back to the time-slot switching unit MTS and the latter switches the check words onto a receiving multiplex line EMX in a time slot that, on this receiving multiplex line, is allocated to the appertaining tests, i.e. to the test of the switching technology in a switching via the mentioned group coupler GS.

Given the described time conditions, 128 time slots can be formed on the receiving multiplex line EMX. The receiving multiplex line EMX is connected to a receiving circuit E.

The receiving circuit E is designed for the implementation of a plurality of tests sequencing in parallel in time-division multiplex operation. It comprises a comparator utilized in common for all tests in the form of an EXCLUSIVE OR gate EXOR at whose one input the check words transmitted back after mirroring, converted by the time-slot switching unit MTS into the appertaining time slot, and delivered on the receiving multiplex line EMX proceed and at whose other input a corresponding check word delivered directly from the check word generator is supplied. The comparator executes a bit-serial comparison.

In order to take into consideration the transit times that elapse given traversal of the parts of the switching center to be tested, the test patterns that are transmitted back are evaluated at the receiving side only after a waiting time that is longer than the maximum transit time to be anticipated. To this end, the access to the receiving circuit E is respectively inhibited with an inhibit element S for a duration of 2 ms after the transmission of a check word. Just like the check word generator TPG and the individual component parts of the receiver E, the inhibit element S is under the influence of a clock control by a clock T.

A further component of the receiver E is an error counter FZ for counting the bit errors of a check word identified in the comparison; the bit counter FZ is capable of counting up to 8 bits.

The receiving circuit E also comprises a write-read memory RAM in which particulars concerning the results of the tests, namely particulars about the counter readings of the error counter FZ, are stored in the memory cells individually allocated to the individual tests. The input of these particulars occurs via an adder ADD that adds the error counter readings to the appertaining error counter readings that are already situated in the write-read memory RAM.

The evaluation of the contents of the memory cells of the write-read memory RAM, i.e. particularly a threshold evaluation, is assumed by a microprocessor MP that has asynchronous access to the memory cells via a processor interface P. In case of a overflow of a memory cell of the write-read memory, this is inhibited for a further write-in access until the microprocessor has read the content of the memory cell in order to avoid the simulation of a false result.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement for testing parts of a digital time-division multiplex telecommunication switching center of the type in which a check word generator generates check words which are transmitted from a sending station through designated parts of a switching center and, after mirroring, are transmitted back to a receiving device at the sending station, the improvement wherein:
    a receiving multiplex line is connected to receive the returned check words in time slots allocated to the individual tests;
    the receiving device is utilized for a plurality of non-identical tests sequencing in parallel in time-division multiplex operation, said receiving device connected to said receiving multiplex line and including a comparator connected to said check word generator and shared in common by all tests and operated during corresponding time slots to compare the returned check word with the corresponding transmitted check word, a memory for storing information in test allocated memory cells regarding coincidence errors, and drive means connected between said comparator and said memory for producing the information for storage.

2. The improved circuit arrangement of claim 1, wherein:
    said comparator comprises an EXCLUSIVE-OR gate for a bit-by-bit comparison.

3. The improved circuit arrangement of claim 1, wherein said drive means of said receiving device comprises:
    a common error counter connected to said comparator; and an adder connected between said counter and said memory for adding error counts stored in said memory to the error count of said counter for up-dating the information stored in said memory.

4. The improved circuit arrangement of claim 3, and further comprising:

an interface connected to said memory; and a microprocessor connected to said memory via said interface and operated to asynchronously access the content of said memory cells.

5. The improved circuit arrangement of claim 1, and further comprising:

a clock generating clock pulses; and an inhibit element connected between said receiving device and said multiplex receiving line and between said receiving device and said check word generator and connected to said clock and operated by said clock pulses, at the beginning of a test, to suppress the forwarding of returned check words to said receiving device and, during a test, to suppress the forwarding of the returned check words until the expiration of the longest transit time to be anticipated.

* * * * *